(12) United States Patent
Clenet

(10) Patent No.: US 8,042,210 B2
(45) Date of Patent: Oct. 25, 2011

(54) ARTICULATING BED SYSTEM

(76) Inventor: Alain Clenet, Santa Ynez, CA (US)

( * ) Notice: Subject to any disclaimer, the term of this patent is extended or adjusted under 35 U.S.C. 154(b) by 89 days.

(21) Appl. No.: 12/367,538

(22) Filed: Feb. 8, 2009

(65) Prior Publication Data

US 2010/0199433 A1    Aug. 12, 2010

(51) Int. Cl.
*A47B 7/00*    (2006.01)
(52) U.S. Cl. ..................... 5/618; 5/617; 5/600
(58) Field of Classification Search .......... 5/424, 425, 5/427, 613, 618, 611, 600, 617, 11
See application file for complete search history.

(56) References Cited

U.S. PATENT DOCUMENTS

| | | | | |
|---|---|---|---|---|
| 1,297,698 A | * | 3/1919 | Kreuzkamp | 5/193 |
| 1,328,802 A | * | 1/1920 | Anderson | 5/610 |
| 2,560,689 A | * | 7/1951 | Dorton | 5/140 |
| 5,090,070 A | * | 2/1992 | Heinz | 5/611 |
| 2002/0053109 A1 | * | 5/2002 | Elliott | 5/618 |
| 2005/0102754 A1 | * | 5/2005 | Barthelt | 5/618 |
| 2007/0157387 A1 | * | 7/2007 | Mossbeck | 5/618 |
| 2008/0000027 A1 | * | 1/2008 | Clenet | 5/618 |

* cited by examiner

*Primary Examiner* — Robert G Santos
*Assistant Examiner* — Brittany Wilson
(74) *Attorney, Agent, or Firm* — Felix L. Fischer

(57) ABSTRACT

A mechanism for activation of an articulating bed incorporates at least one mattress support plate and a pair of side rails. A rack is attached to each side rail and a torque tube extends between the side rails with a pinion gear at each end engaging a respective one of the racks. An actuator imparts translational motion to the torque tube perpendicular to its axis. Elevation bars connected to the torque tube and the support plate are angularly displaced by translation of the torque tube.

18 Claims, 16 Drawing Sheets

ARTICULATING BED SYSTEM

BACKGROUND

1. Field

This invention relates generally to the field of adjustable beds and more particularly to a structure for an articulating bed having matched gear drives operable through a single actuator for mechanism reliability.

2. Description of the Related Art

Articulating beds have long been used in hospital and healthcare facilities to allow positioning of a patient in a reclining position, sitting position, elevated leg position or combinations of these positions. General usage of articulating beds has been rapidly expanding due to the comfort and convenience available from adjusting the bed to desired positions for reading, general relaxation or sleeping.

The mechanical structure and drive mechanisms for such articulating beds must be able to support the weight of both a mattress and the occupant. Due to the size, weight, fabrication materials and configuration of the mattress and supporting structure, maintaining rigidity in the system may also be challenging. Prior art systems rely on multiple motors and/or lever mechanisms to provide adjustment of the head and foot elements of the bed. Typically drive motors or other actuation component must be placed symmetrically to avoid binding created by torsional flexibility of the mattress and supports. The cost, complexity and weight of these systems can be undesirable.

SUMMARY

The embodiments disclosed herein overcome the shortcomings of the prior art by providing an actuating mechanism for an articulating bed which incorporates a torque tube having a pinion gear at each end and an actuator imparting translational motion to the torque tube perpendicular to its axis. A rack associated with each pinion gear is attached to an associated side rail and at least one elevation bar is connected to the torque tube and a mattress support plate. The elevation bar is angularly displaced by translation of the torque tube to elevate the support plate.

In various aspects of the embodiment, the actuator comprises a linear actuator which is attached to one side rail and incorporates an end fitting having a bore to receive the torque tube for rotational motion. In another aspect of the embodiment, the at least one elevation bar is two symmetrically positioned elevation bars, each elevation bar having an end fitting with a bore to receive the torque tube for rotational motion.

In additional aspects of the embodiments, each side rail has a top flange, a bottom flange and a plate extending from the top flange to the bottom flange as an external shield for the associated rack and pinion. An internal shield is associated with each side rail and has a top plate received over the top flange of the side rail and a side plate depending from the top plate with an aperture to receive the torque tube. The internal shield translates with the torque tube.

In an alternative embodiment, the actuating mechanism employs a toothed belt fixed at a first end to the side rail and engaging a gear on the torque tube. A second end of the toothed belt engages and is wound on a rotating sprocket.

In use, the embodiments provide an articulating bed which employs at least one mattress support plate and a pair of side rails vertically spaced from the support plate. A rack is attached to each side rail and a torque tube extends between the side rails with a pinion gear attached at each end to engage a respective one of the racks. An actuator imparts translational motion to the torque tube perpendicular to an axis of the torque tube. At least one elevation bar is connected to the torque tube and the support plate which is angularly displaced by translation of the torque tube to elevate the support plate from a horizontal position.

BRIEF DESCRIPTION OF THE DRAWINGS

These and other features and advantages of the present invention will be better understood by reference to the following detailed description of exemplary embodiments when considered in connection with the accompanying drawings wherein.

DETAILED DESCRIPTION

Figure 1:
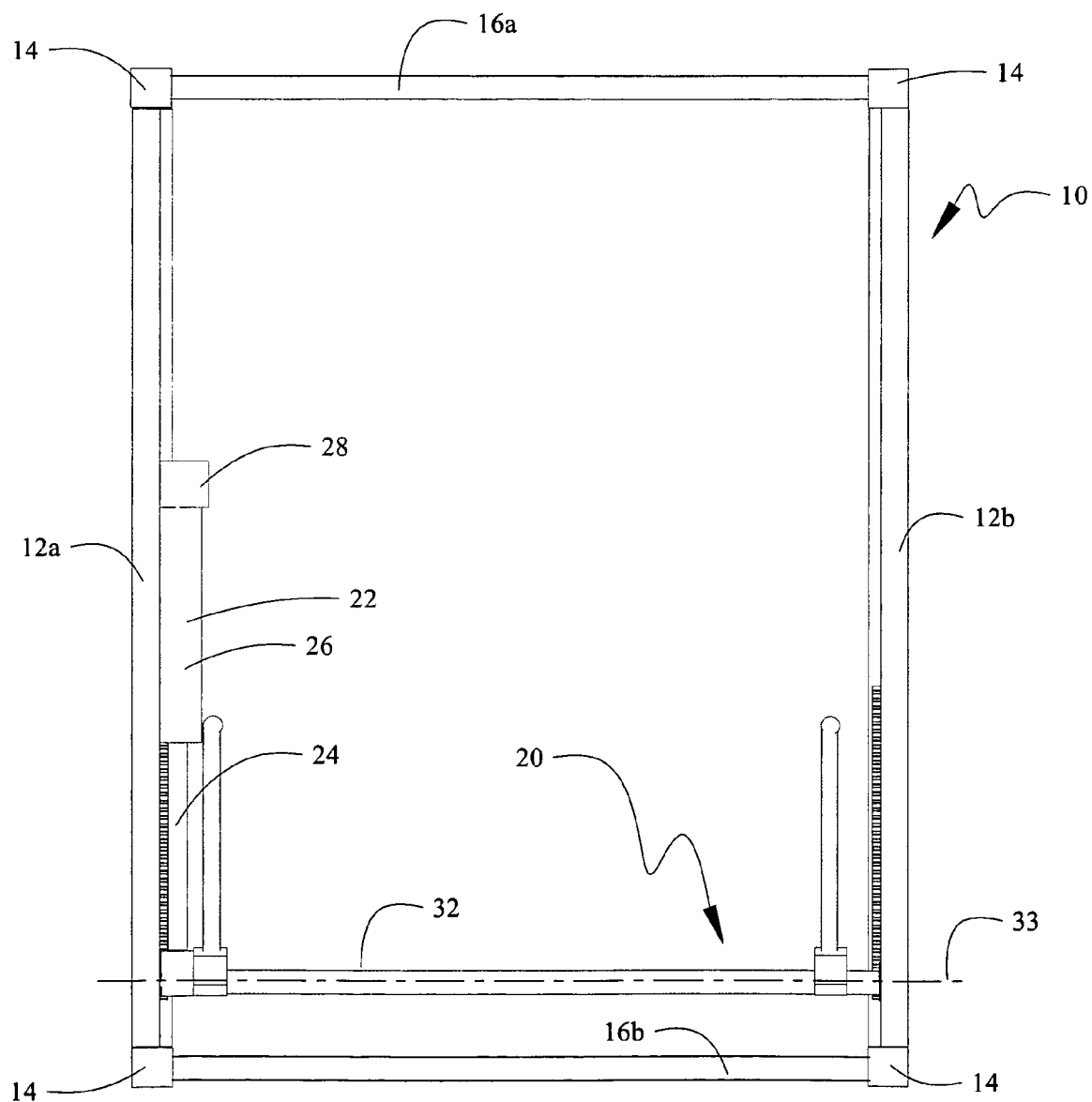
FIG. 1 is a top view of an exemplary embodiment implementing a linear actuator for elevating one portion of the bed.

Embodiments shown in the drawings and described herein provide an actuation system for an articulating bed which simplifies the drive components and actuation requirements while preventing torsional effects which might otherwise create binding of the actuation mechanism. Sufficient torsional support for the movable portions of the bed is also provided for rigidity with minimal structural weight or complexity. Referring to FIG. 1, bed 10 incorporates a frame having side rails 12a and 12b. For the embodiment shown in the drawings corner posts 14 are present at the end of the side rails and receive end rails 16a and 16b to complete the frame. And actuating mechanism 20 provides for elevation of a selected portion of a mattress as will be described in greater detail subsequently. The actuating mechanism may be driven by a single actuator 22, which for the embodiment shown is a linear actuator having a telescoping rod 24 extending from a barrel 26. A motor 28 provides rotation of the barrel for extension and retraction of the rod. In alternative embodiments, multiple actuators may be employed for each movable section.

Figure 2:
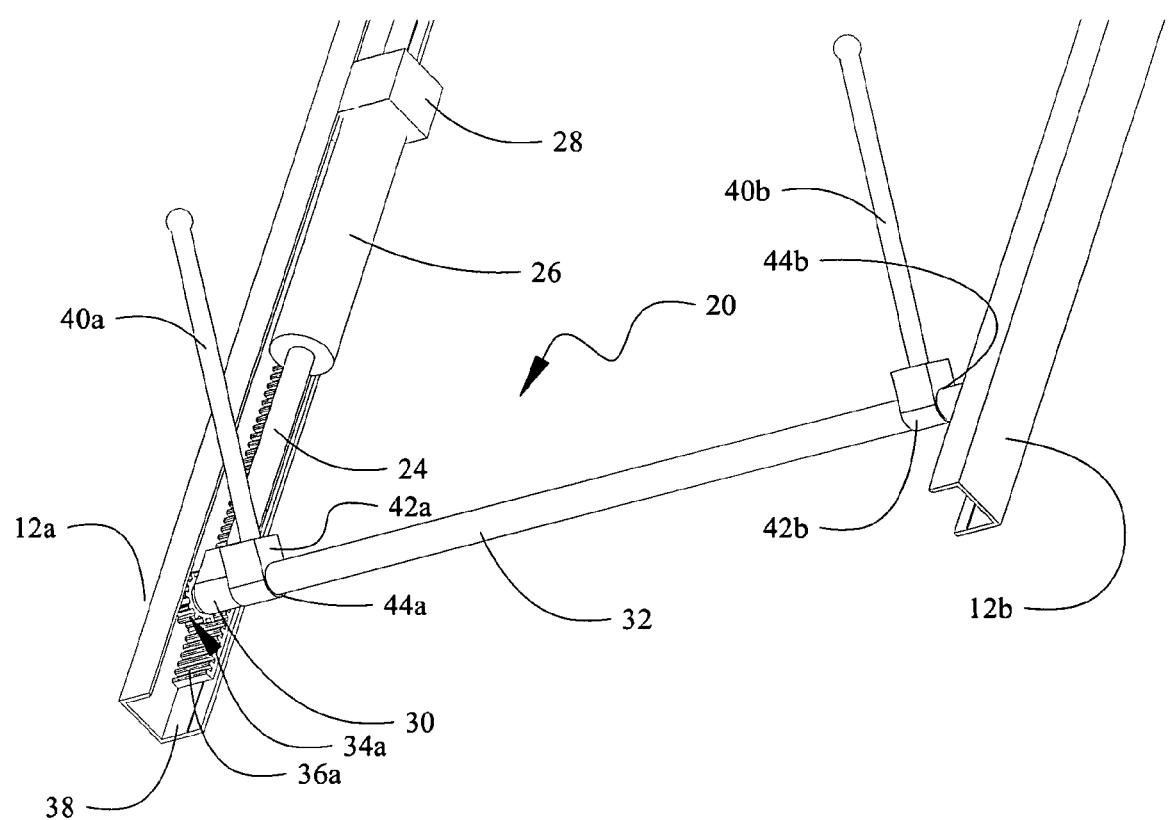
FIG. 2 is an isometric view of the drive components for the embodiment of FIG. 1.
Figure 3:
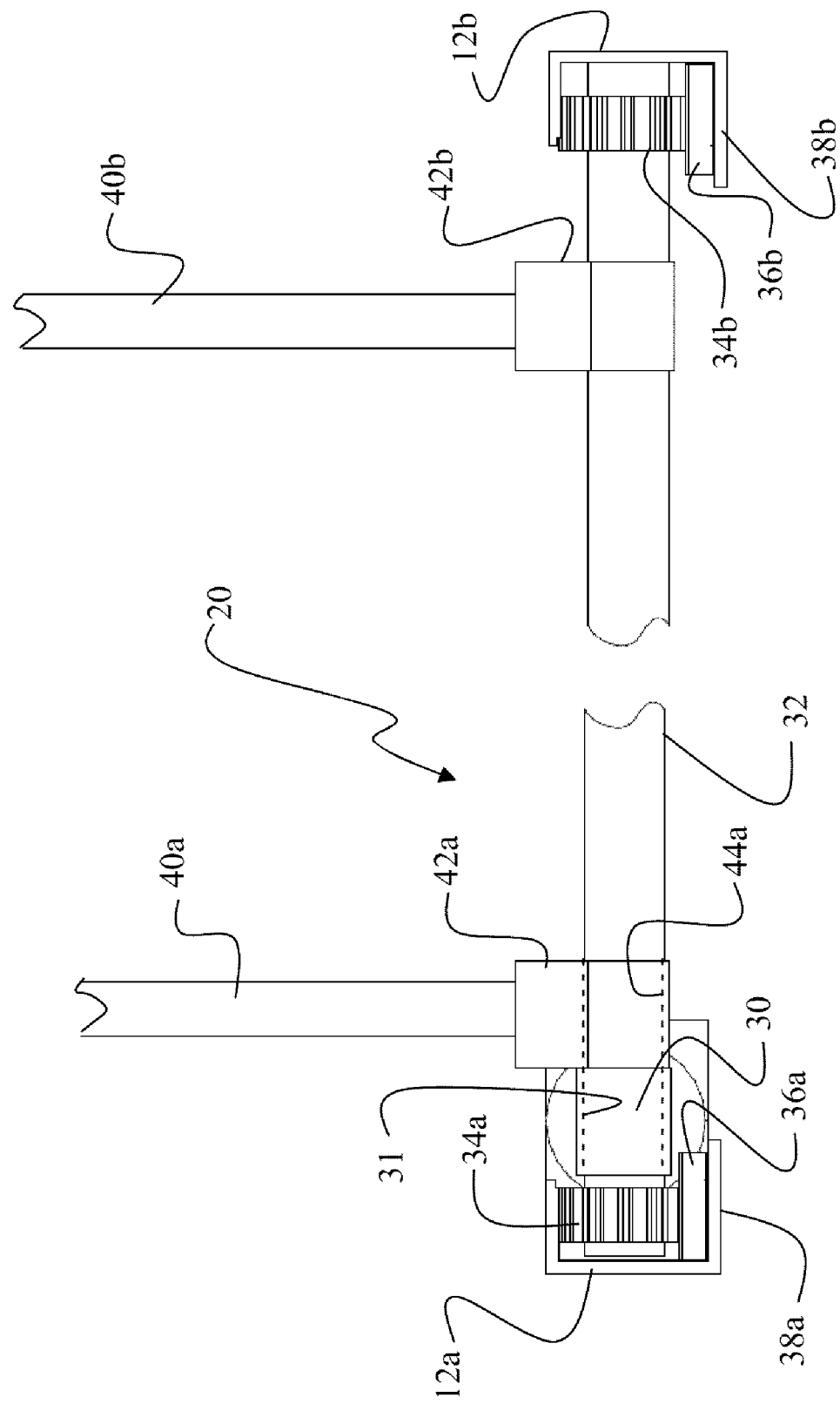
FIG. 3 is detail end view of the torque tube and synchronization elements of the embodiment as shown in FIG. 2.

As best seen in FIG. 2, telescoping rod 24 incorporates an end fitting 30 which receives a torque tube 32 through a bore 31 (best seen in FIG. 4B) for rotational motion. A pinion gear 34*a* is attached to a first end of the torque tube and rides on a rack 36*a* attached to a lower flange 38*a* of side rail 12*a*. As shown in FIG. 3, a second end of torque tube 32 carries a pinion gear 34*b* which rides on a rack 36*b* attached to a lower flange 38*b* of the second side rail 12*b*. Elevation bars 40*a* and 40*b* are carried by end fittings 42*a* and 42*b*. End fittings 42*a* and 42*b* incorporate bores 44*a* and 44*b* respectively to receive the torque tube 32 which rotates within the bores.

Extension and retraction of actuator rod 24 causes the torque tube to translate in a direction perpendicular to its axis 33 and parallel to rails 12*a* and 12*b*. Pinion gears 34*a* and 34*b* riding on racks 36*a* and 36*b* create rotation in the torque tube thereby maintaining alignment. Translation of the torque tube results in angular rotation of the elevation bars to raise and lower a support plate for the mattress portion being elevated as will be described in greater detail subsequently. The structural support by the multiple elevation bars supported from the torque tube provides good torsional stability for the elevating head portion of the bed without requiring excessive structural weight or complexity.

Actuation mechanism 20 allows a single actuator to uniformly position the symmetrical elevation bars without any torsional binding which could occur based on the flexibility of the support plate and mattress. The use of the pinion gears at each end of the torque tube allows non-symmetrical positioning of the linear actuator thereby allowing attachment of the actuator and motor to a single side rail without additional cross-rail structural elements. The actuator may be located at any position along the torque tube which may be most convenient based on the available mounting structure.

Figure 4A:
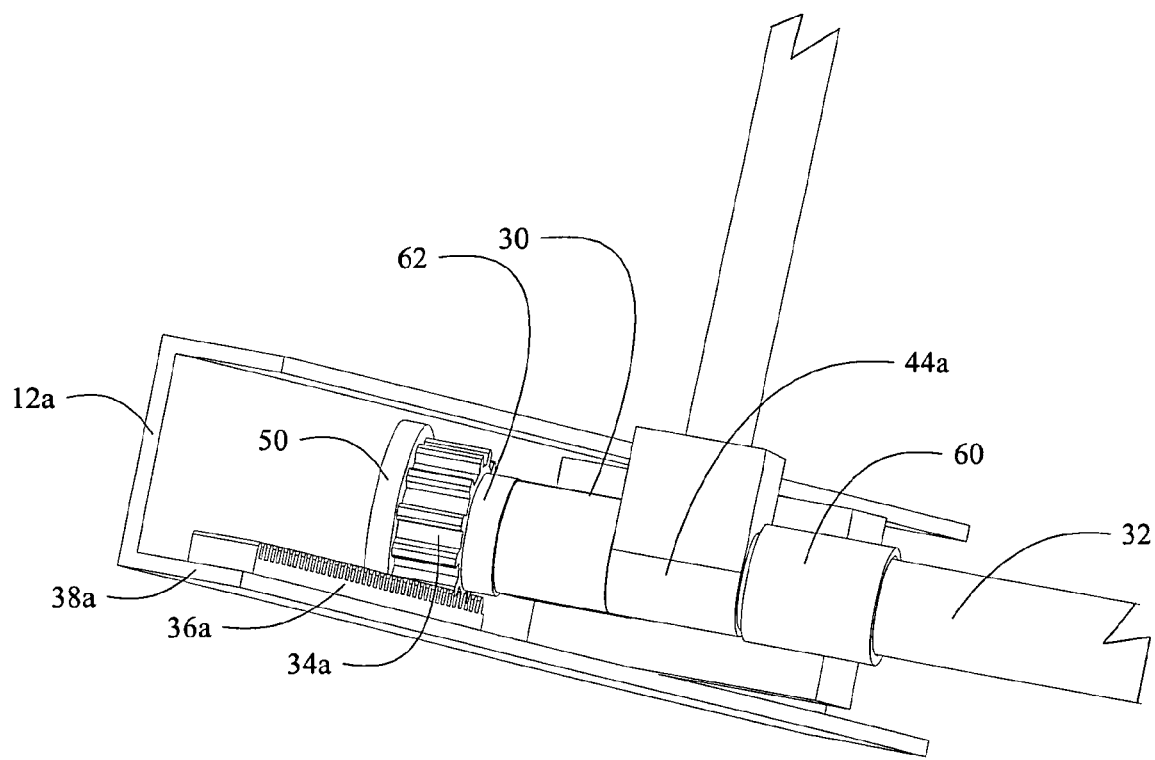
FIG. 4A is an isometric view of an alternative embodiment of the torque tube and synchronization elements of the embodiment.
Figure 4B:
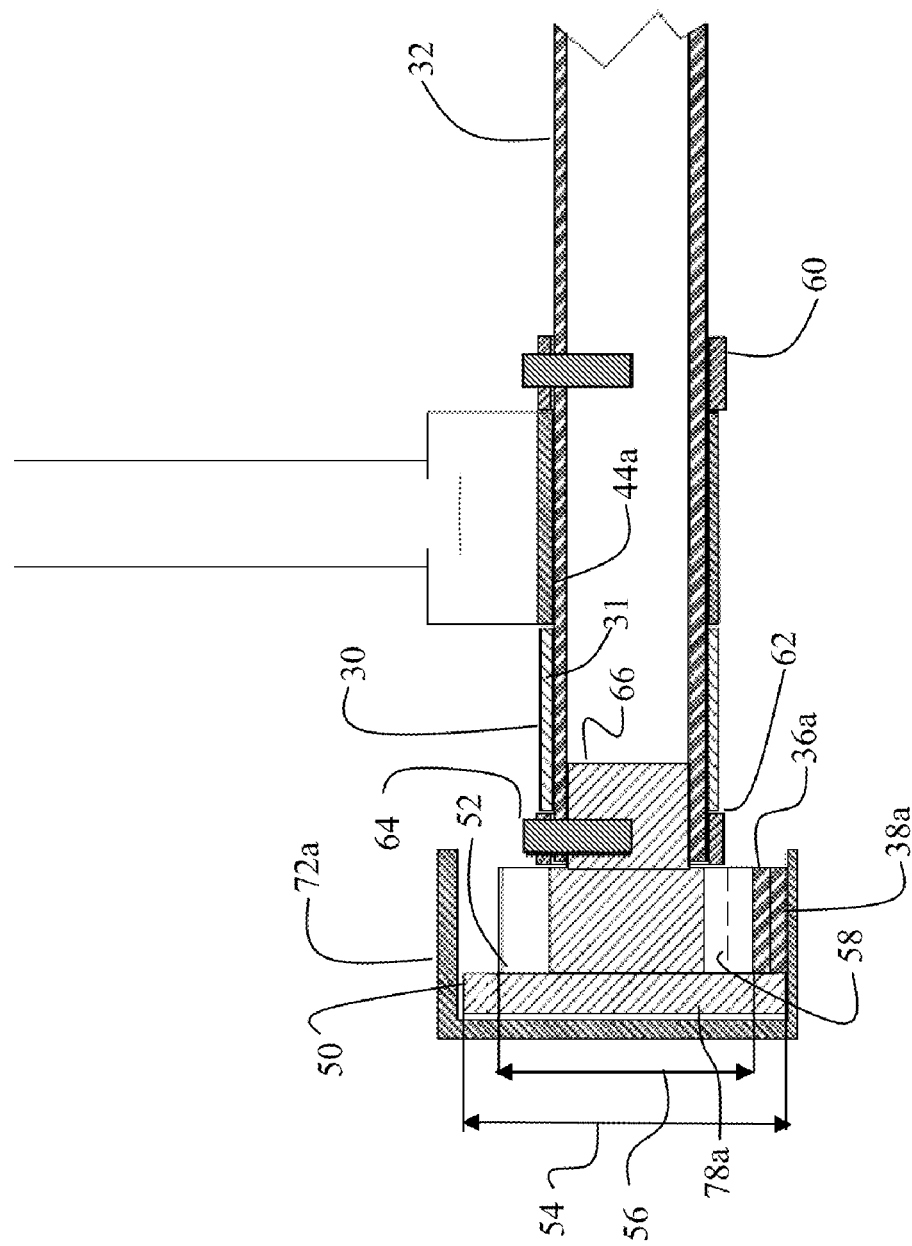
FIG. 4B is a section view of the alternative embodiment of FIG. 4A.
Figure 4C:
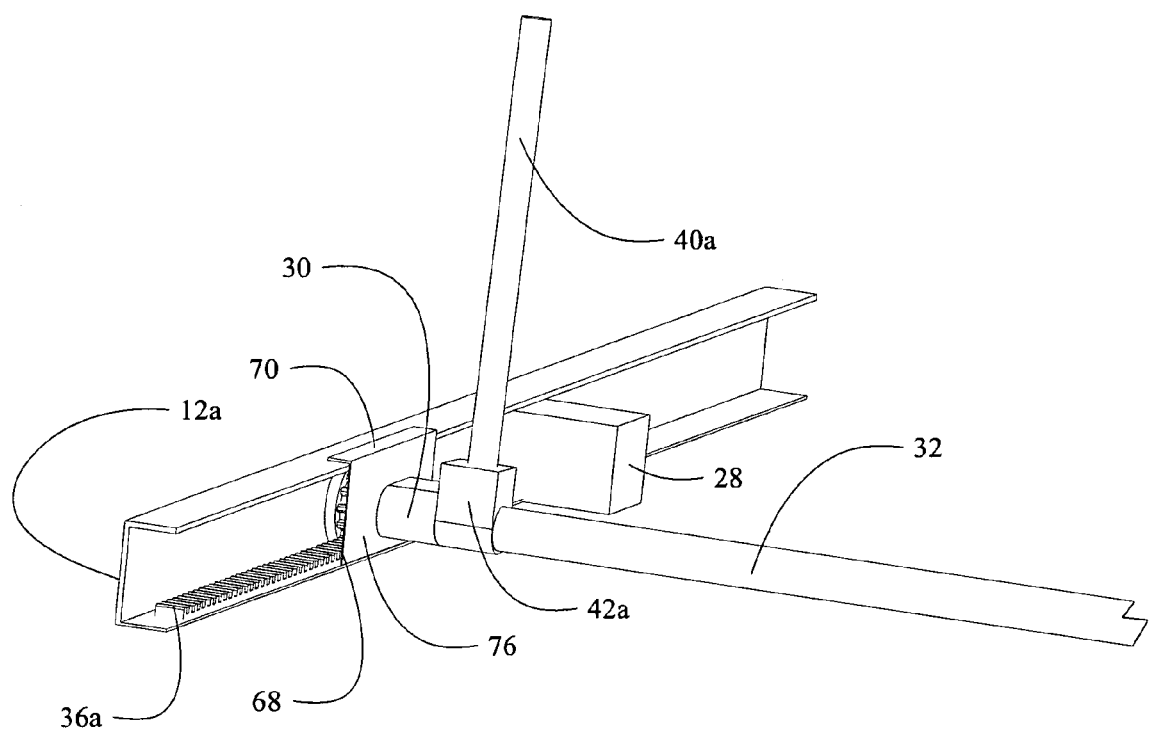
FIG. 4C is an isometric view of the embodiment of FIG. 4A with a shield for the operating components

Additional details of an exemplary embodiment for elements of actuation mechanism 20 are shown in FIGS. 4A, 4B and 4C. An end cap 50 is attached to the outboard surface 52 of the pinion gear 34*a*. The end cap has a diameter 54, greater than diameter 56 of the pinion gear, which extends over an outer edge 58 of rack 36*a* to prevent motion of the pinion gear and attached torque tube along the axis of the torque tube. This additionally maintains engagement of the pinion on the rack by preventing the pinion from jumping off the rack due to the proximity of the cap to the upper flange 72*a* of the side rail and prevents the pinion from abraiding the side rail. Lock rings 60 and 62 are received over the torque tube inboard and outboard, respectively, of end fittings 44*a* and 30 to avoid canting of those fittings with respect to the torque tube thereby avoiding binding. Attachment of the locking rings and pinion gear to the torque tube may be accomplished using diametric pins 64 or set screws. A shank 66 extending from pinion gear 34*a* is received within a central bore of the torque tube and is pinned using a common diametric pin with lock ring 62 for the embodiment shown.

Figure 5:
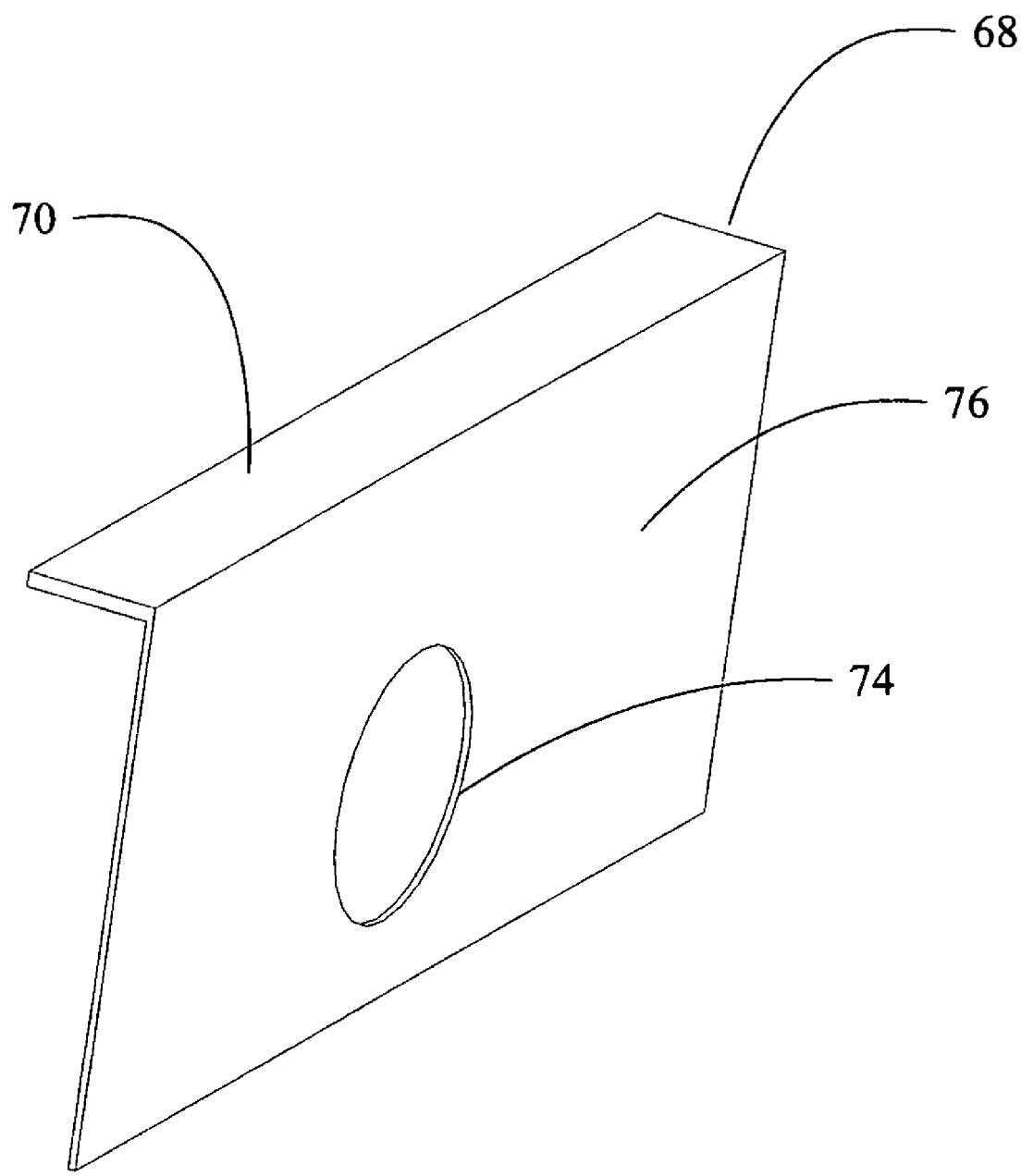
FIG. 5 is an isometric view of the safety shield of FIG. 4C.

A plastic shield 68, also shown in FIG. 5, incorporates a top plate 70 which rides on an upper flange 72*a* of side rail 12*a*. An aperture 74 in side plate 76 receives torque tube 32. As torque tube 32 translates along the rails, shield 68 is drawn along the side rail thereby providing complete shielding of the rotating interface between the pinion gear and rack to avoid any pinching hazard. The configuration of side rails 12*a* and 12*b* with plates 78*a* and 78*b* extending between the top and bottom flanges of each side rail shields the actuation mechanism from the exterior of the bed.

Figure 6A:
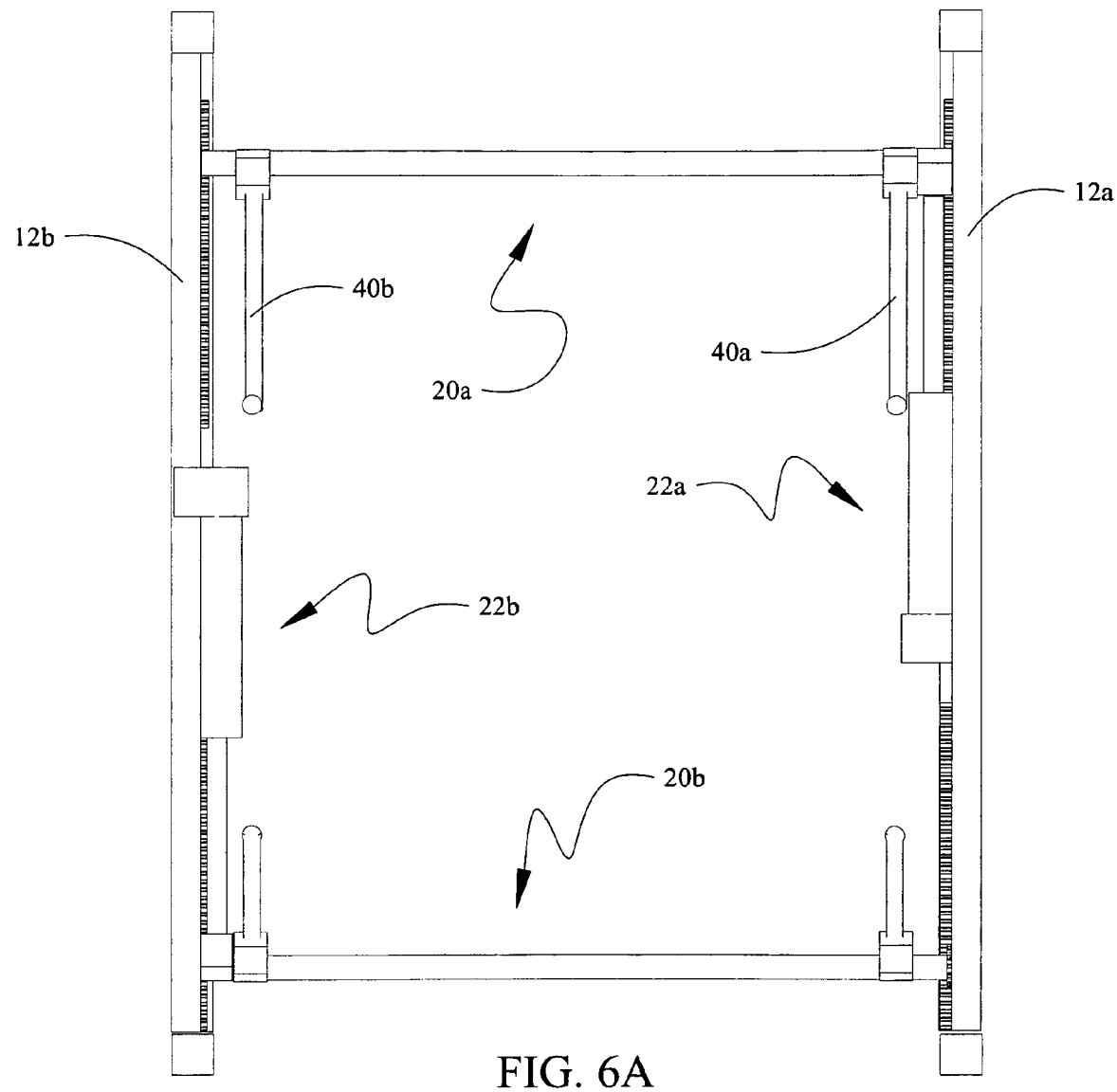
FIG. 6A is an top view of the embodiment employing a mirrored linear actuator drive system for positioning of both upper and lower bed elements.
Figure 6B:
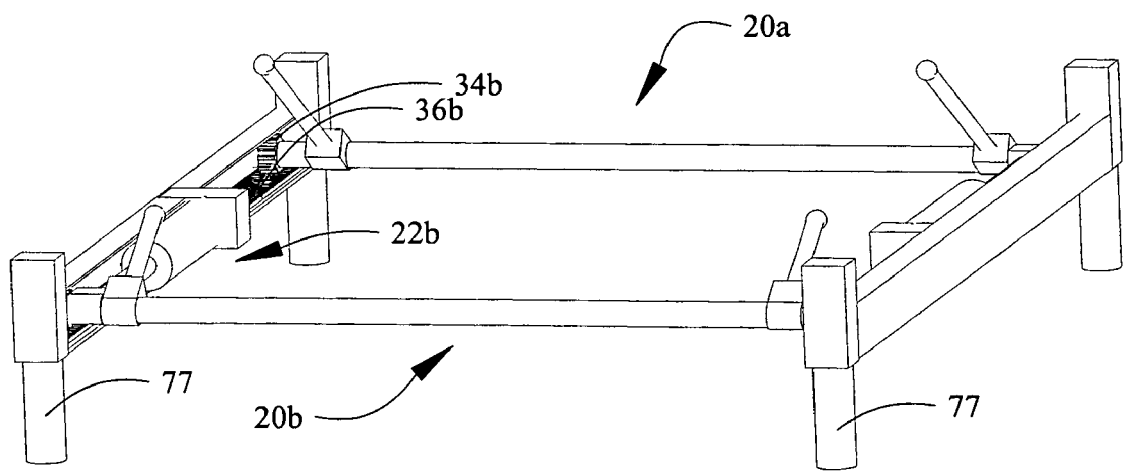
FIG. 6B is a isometric view of the embodiment of 6A employing a mirrored linear actuator drive.
Figure 7A:
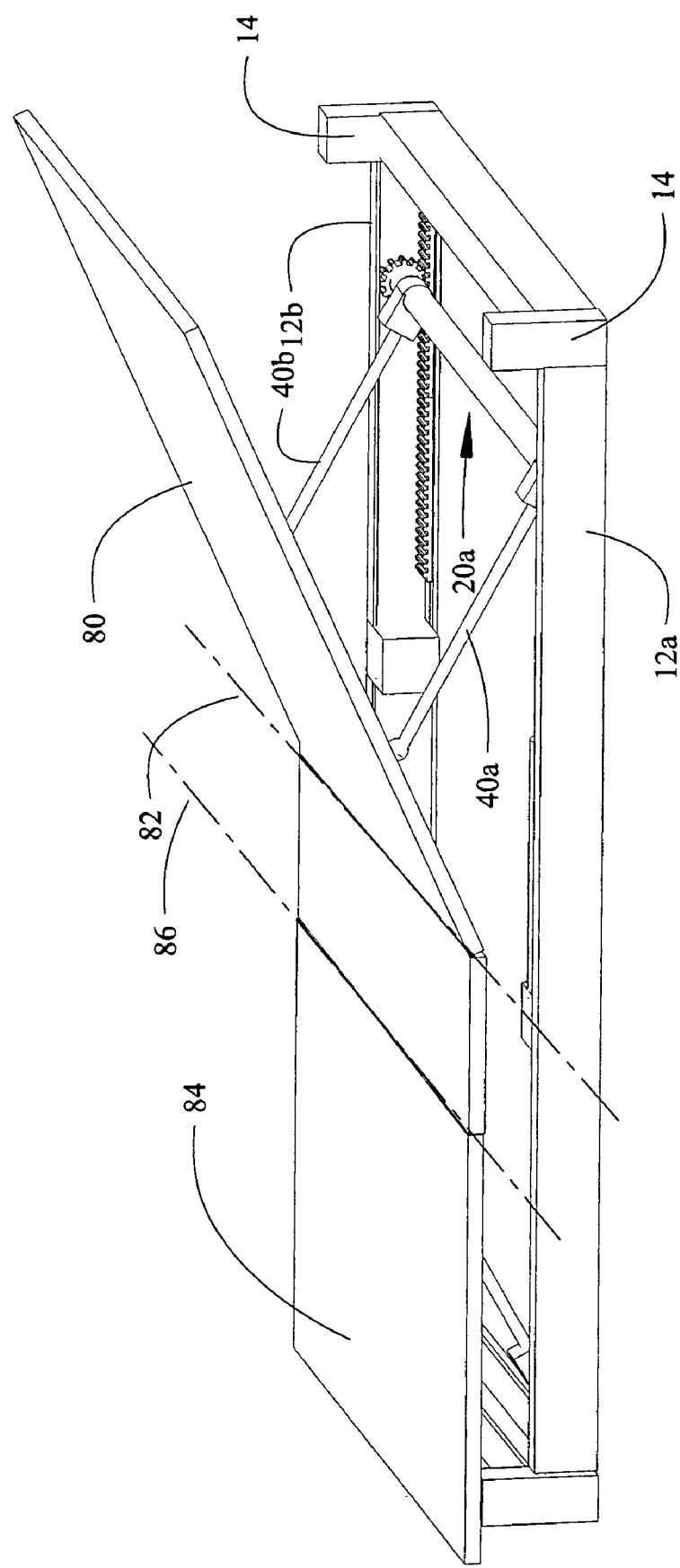
FIG. 7A is an isometric view of the embodiment of FIG. 6A with the head element raised to a medium height and the foot element flat.
Figure 7B:
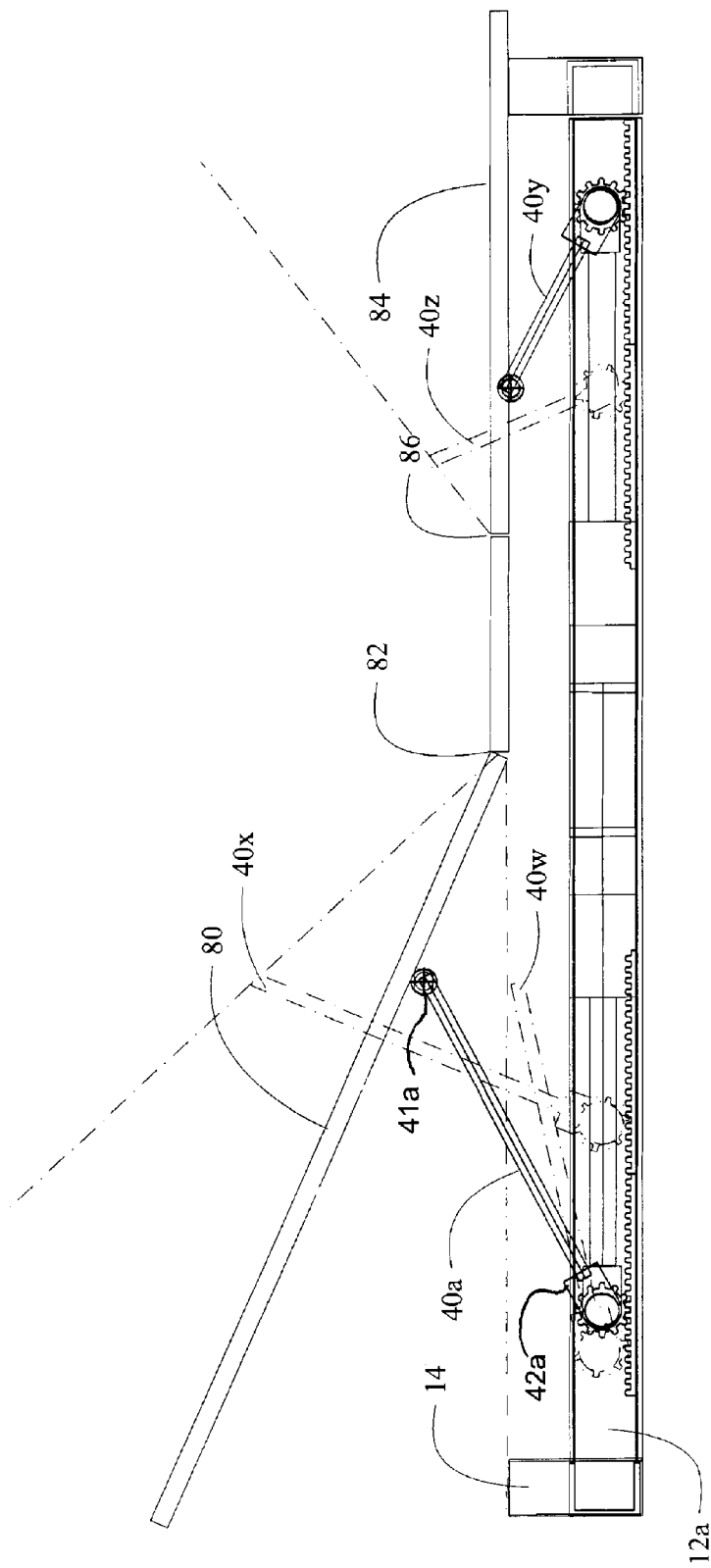
FIG. 7B is a side section view of the embodiment of FIG. 7A.

The configuration of the actuation mechanism with use of a single actuator allows simple configuration for multiple portions of the mattress to be separately elevated. As shown in FIGS. 6A and 6B, a first actuation mechanism 20*a* may be incorporated for elevation of a head portion while a second actuation mechanism 20*b* may be incorporated for elevation of a foot portion. The embodiment shown in FIGS. 6A and 6B employs symmetrical mounting of the actuators for the actuation mechanisms on opposite rails of the bed however in alternative embodiments the actuators may be mounted to a single rail. As best seen in FIG. 6B the side rails, end rails and associated corner blocks are supported by bed legs 77 for the embodiment shown but may be floor mounted. As shown in FIGS, 7A and 7B, a support plate 80 for the head portion of the mattress rests in the horizontal position on corner blocks 14, or alternative extensions thereof as subsequently described with respect to FIGS. 9A, 9B, 10 and 11, vertically spaced from the side rails and is rotated about a pivot 82 by the elevation rods which are angularly displaced as shown in phantom for a first retracted position 40*w* and a second elevated position 40*x* created by translation of the torque tube responsive to the first actuator 22*a*. Pinned connection of the elevation rods to the torque tube through end fittings 42*a* and 42*b* at their base, as previously described, and to the support plate at an end 41*a*. as an example, distal from the base causes translation of the base with the torque tube and resultant angular rotation due to the compressional rigidity of the rods. Similarly a second support plate 84 for a foot portion of the mattress is rotated about a pivot 86 by the elevation rods of the second actuation mechanism as shown for a first retracted position 40*y* and, in phantom, a second elevated position 40*z*.

Figure 8A:
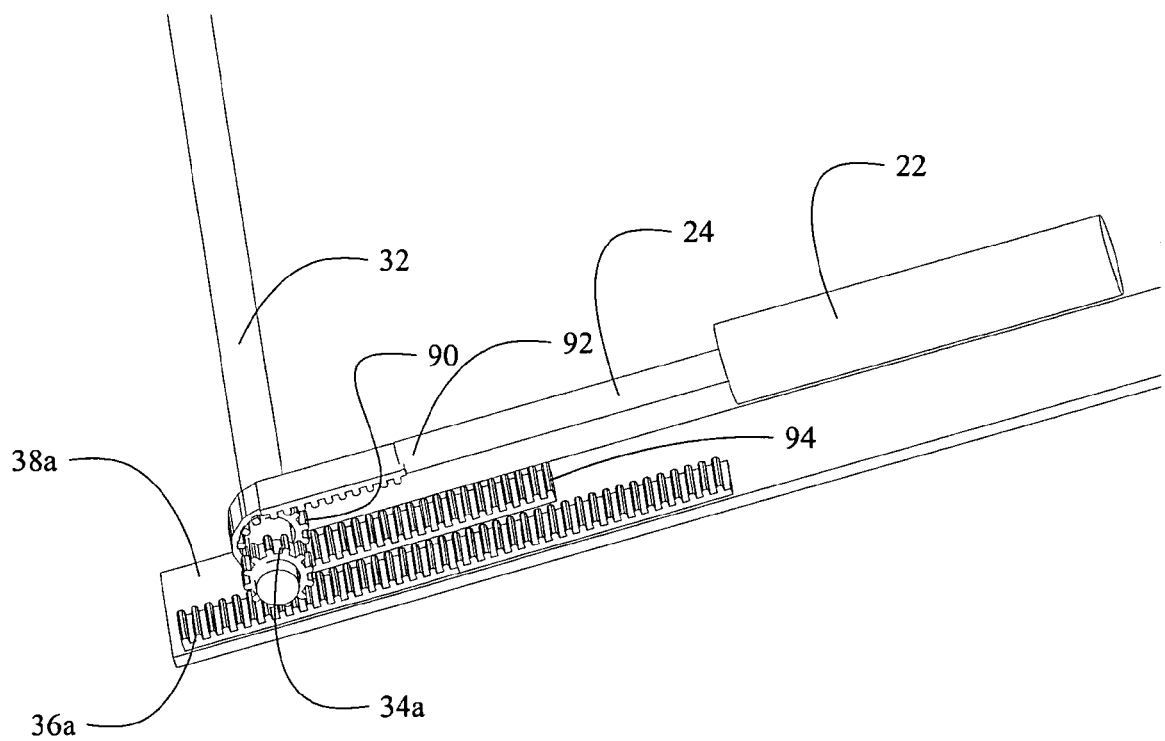
FIG. 8A is an isometric view of an alternative gear drive arrangement with a linear actuator drive.
Figure 8B:
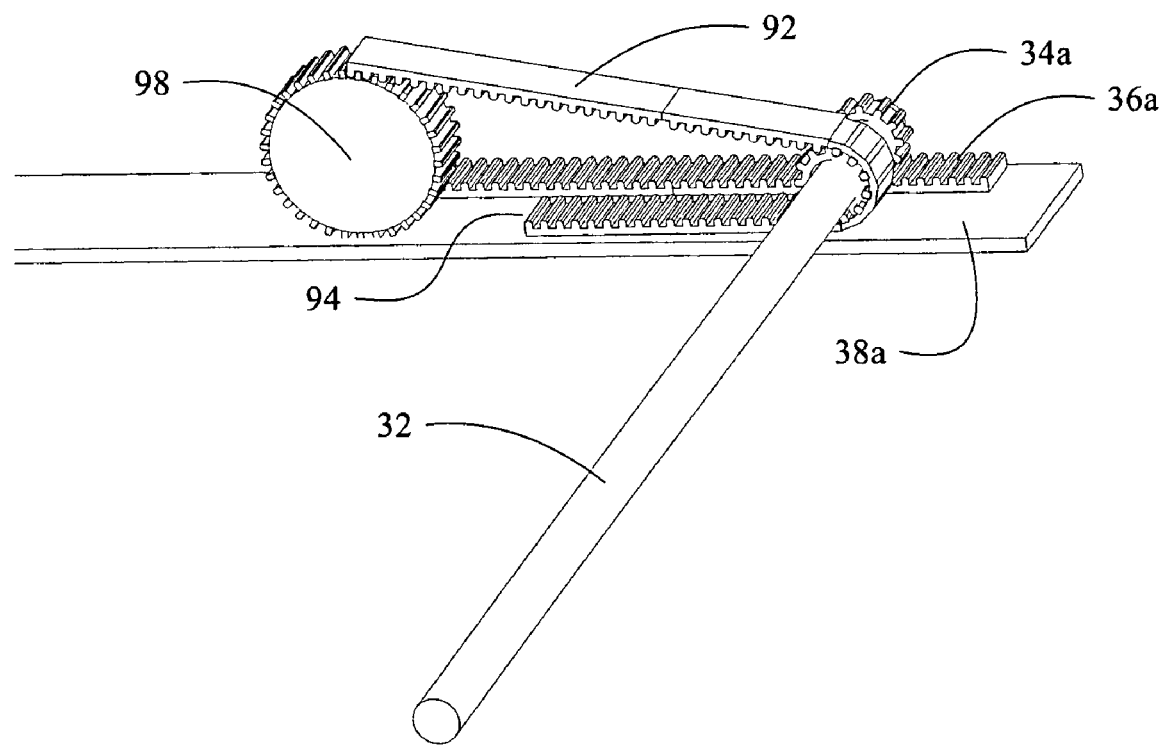
FIG. 8B is an isometric view of the alternative gear drive arrangement with a sprocket drive.
Figure 9A:
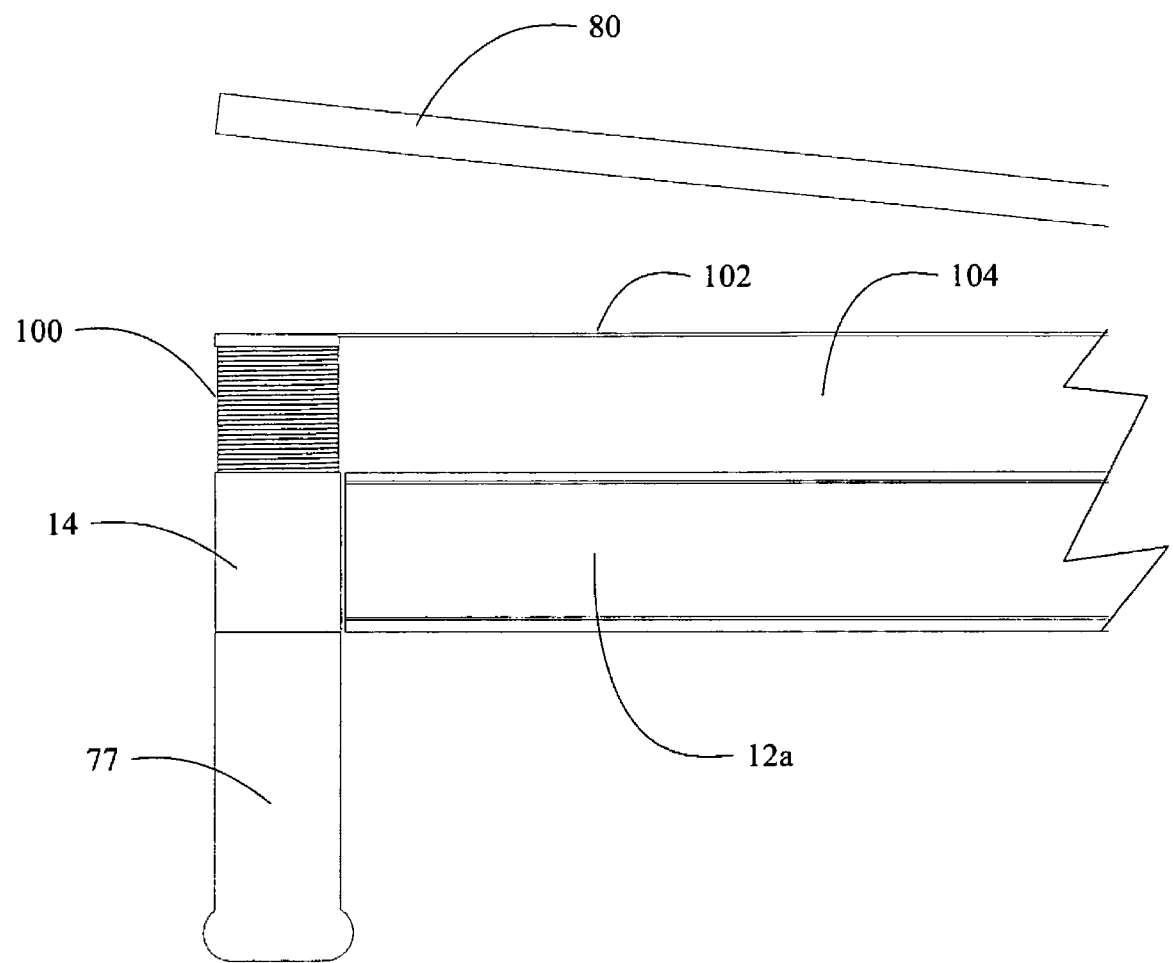
FIG. 9A is a detailed side view of a collapsing safety corner for use with the embodiments described.
Figure 9B:
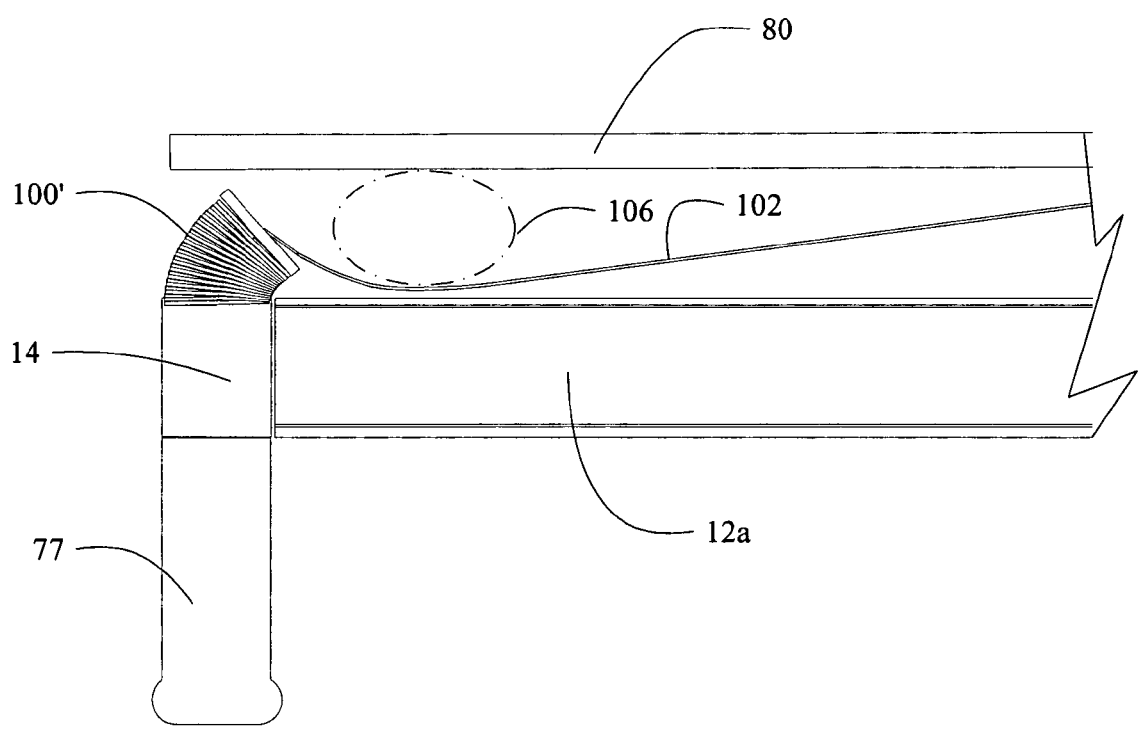
FIG. 9B is a detailed side view of the safety corner in the activated condition.
Figure 11:
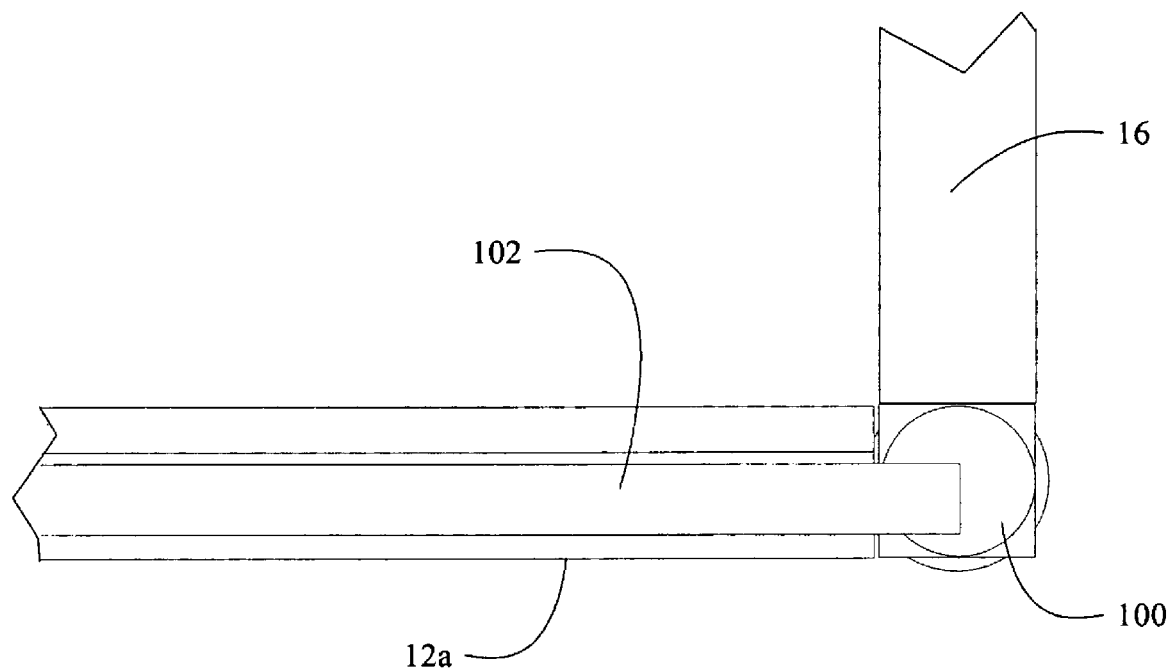
FIG. 11 is a top view of the collapsing safety corner of FIG. 9.
Figure 10:
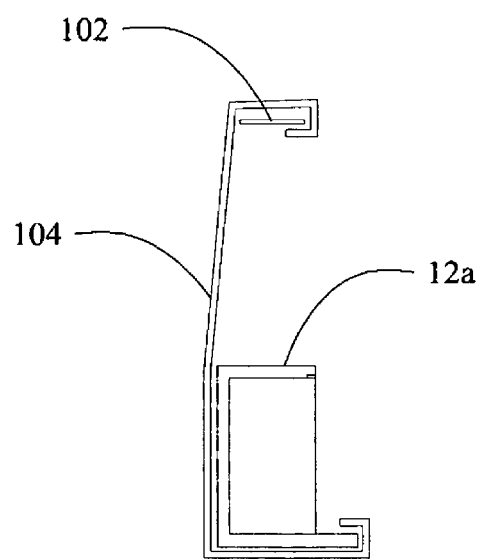
FIG. 10 is a section end view of the collapsing safety corner elements of FIG. 9A.

An alternative to the linear actuator described with respect to the previous embodiments is shown in FIGS. 8A and 8B. Torque tube 32 incorporates a first gear portion 90 which receives a mating toothed belt 92. The belt is fixed at a first end 94 to the lower flange of the side plate. A second end 96 of the belt is drawn to a linear actuator 22 by rod 24 as shown in FIG. 8A or wound on a rotating sprocket 98 as shown in FIG. 8B resulting in translation of the torque tube. The sprocket may be driven by a standard rotating motor (not shown). While a toothed belt is shown for the embodiment of FIG. 8 a chain of alternative engagement mechanism may be employed in alternative embodiments. Pinion gear 34*a* is shown on the end of the torque tube for symmetrical operation as in the previously described embodiment. However, in alternative embodiments, the separate pinion gear may be eliminated by relying on the toothed belt to create the rotation of the torque tube with the pinion gear at the opposite end of the torque tube assuring the matching rotational velocity and translation of that end of the torque tube.

Additional safety elements are incorporated in the embodiments, shown in the drawings as previously described, to prevent openings in the structure where, for example, the mattress and mounting plates may be fixed above the level of the side rails and other frame elements of the bed. As shown in FIGS. 9A and 9B, 10 and 11, a resilient member such as a flat coil spring 100 is provided extending upwardly from each corner block 14. Plate 80 supporting the mattress head portion, for example, rests on the top of the flat coil springs in the horizontal position. A skirting strip 102 which may be plastic, heavy-duty fabric, or other suitable material extends between the coil springs. A fabric skirt 104 is connected to the skirting strip and draped downwardly attaching to the side rail. The fabric skirt prevents insertion of objects or body parts into the aperture between the plate and side rail. Additionally, attachment of the skirt and skirting strip to the flat coil springs allows resilient deformation should any object or body part be inserted over the skirting strip when the plate is rotated upwardly using the actuators as previously described and then trapped by a downward rotation of the plate. As shown in in FIG. 9B engagement by an intruding element 106, such as an arm or hand, would result in depression of the skirting strip with a resultant inward deformation of the flat coil spring as noted by element 100'. This prevents any significant pressure on the intruding object. Flat coil springs 100 provide additional vertical support for plate 80 supplementing support provided by the elevation bars.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. An actuating mechanism for an articulating bed comprising:
    a torque tube having a pinion gear at each end thereof;
    an actuator imparting translational motion to the torque tube perpendicular to an axis of the torque tube;
    a rack associated with each pinion gear and attached to an associated side rail;
    at least one elevation bar connected to the torque tube at a base and at a pinned connection at an end distal from the base to a mattress support plate, said at least one elevation bar angularly displaced by translation of the torque tube and pinion gears to elevate the support plate.

2. The actuating mechanism as defined in claim 1 wherein the actuator comprises a linear actuator.

3. The actuating mechanism as defined in claim 2 wherein the linear actuator is attached to one side rail and incorporates an end fitting having a bore to receive the torque tube for rotational motion.

4. The actuating mechanism as defined in claim 1 wherein the at least one elevation bar comprises two symmetrically positioned elevation bars with pinned connection to the mattress support plate and each elevation bar has an end fitting with a bore to receive the torque tube for rotational motion.

5. The actuating mechanism as defined in claim 1 wherein each side rail has a top flange, a bottom flange and a plate extending from the top flange to the bottom flange as an external shield for the associated rack and pinion.

6. The actuating mechanism as defined in claim 5 further comprising an internal shield associated with each side rail and having a top plate received over the top flange of the side rail and a side plate depending from the top plate with an aperture receiving the torque tube, said internal shield translating with the torque tube.

7. The actuating mechanism as defined in claim 1 wherein each pinion gear includes an end cap having a diameter greater than a diameter of the pinion gear, the periphery of the end cap engaging an outer edge of the associated rack to prevent motion of the pinion along the axis of the torque tube.

8. An actuating mechanism for an articulating bed comprising:
    a torque tube having a pinion gear at each end thereof;
    a toothed belt fixed at a first end to the side rail and engaging a gear on the torque tube, a second end of the toothed belt engaging and wound on a rotating sprocket imparting translational motion to the torque tube perpendicular to an axis of the torque tube;
    a rack associated with each pinion gear and attached to an associated side rail;
    at least one elevation bar connected to the torque tube at a base and a pinned connection at an end distal from the base to a mattress support plate, said at least one elevation bar angularly displaced by translation of the torque tube and pinion gears to elevate the support plate.

9. An articulating bed comprising:
    at least one mattress support plate;
    a pair of side rails vertically spaced from the support plate;
    a rack attached to each side rail;
    a torque tube extending between the side rails and having a pinion gear at each end thereof, each pinion gear engaging a respective one of the racks;
    an actuator imparting translational motion to the torque tube perpendicular to an axis of the torque tube; and
    at least one elevation bar connected to the torque tube at a base and a pinned connection at an end distal the base to the support plate, said at least one elevation bar angularly displaced by translation of the torque tube and pinion gears to elevate the support plate from a horizontal position.

10. The articulating bed as defined in claim 9 wherein the actuator comprises a linear actuator.

11. The articulating bed as defined in claim 10 wherein the linear actuator is attached to one side rail and incorporates an end fitting having a bore to receive the torque tube for rotational motion.

12. The articulating bed as defined in claim 9 wherein the at least one elevation bar comprises two symmetrically positioned elevation bars and each elevation bar has an end fitting with a bore to receive the torque tube for rotational motion.

13. The articulating bed as defined in claim 9 wherein each side rail has a top flange, a bottom flange and a plate extending from the top flange to the bottom flange as an external shield for the associated rack and pinion.

14. The articulating bed as defined in claim 13 further comprising an internal shield associated with each side rail and having a top plate received over the top flange of the side rail and a side plate depending from the top plate with an aperture receiving the torque tube, said internal shield translating with the torque tube.

15. The articulating bed as defined in claim 9 wherein each pinion gear includes an end cap having a diameter greater than a diameter of the pinion gear, the periphery of the end cap engaging an outer edge of the associated rack to prevent motion along the axis of the torque tube.

16. The articulating bed as defined in claim 9 further comprising:
    a corner block attached to first and second ends of each side rail;
    a resilient member extending from each corner block to contact the support plate in the horizontal position;
    a skirt strip extending between resilient members;
    a skirt depending from the skirt strip to the side rail;
    wherein, force on the skirt strip causes lateral deformation in at least one resilient member.

17. The articulating bed as defined in claim 16 wherein the resilient members comprise flat coil springs.

18. An articulating bed comprising
    a mattress head portion support plate and a mattress foot portion support plate;
    a pair of side rails vertically spaced from the support plates;
    a head portion actuation mechanism having
        a first pair of racks attached to the side rails;
        a first torque tube extending between the side rails and having a pinion gear at each end thereof, each pinion gear engaging a respective one of the first pair of racks;

a first linear actuator attached to one side rail and incorporating an end fitting having a bore to receive the first torque tube for rotational motion, said first linear actuator imparting translational motion to the first torque tube perpendicular to an axis of the first torque tube; and a first pair of elevation bars connected to the torque tube at a base and at a pinned connection at an end distal from the base to the head portion support plate, each of said first pair of elevation bars having an end fitting with a bore to receive the torque tube for rotational motion, said first pair of elevation bars angularly displaced by translation of the torque tube and pinion gears to elevate the head portion support plate from a horizontal position;

a foot portion actuation mechanism having a second pair of racks attached to the side rails;

a second torque tube extending between the side rails and having a pinion gear at each end thereof, each pinion gear engaging a respective one of the second pair of racks;

a second linear actuator attached to one side rail and incorporating an end fitting having a bore to receive the first torque tube for rotational motion, said first linear actuator imparting translational motion to the first torque tube perpendicular to an axis of the first torque tube; and a second pair of elevation bars connected to the torque tube at a base and at a pinned connection at an end distal from the base to the foot portion support plate, each of said second pair of elevation bars having an end fitting with a bore to receive the second torque tube for rotational motion, said second pair of elevation bars angularly displaced by translation of the second torque tube and pinion gears to elevate the foot portion support plate from a horizontal position;

a corner block attached to first and second ends of each side rail;

a flat coil spring extending from each corner block to contact the support plate in the horizontal position;

a skirt strip extending between flat coil springs;

a skirt depending from the skirt strip to each side rail;

wherein, force on the skirt strip causes lateral deformation in at least one resilient member.

* * * * *